(No Model.)
H. F. HUBBARD & W. H. NOBLE.
HARROW.
No. 309,624. Patented Dec. 23, 1884.
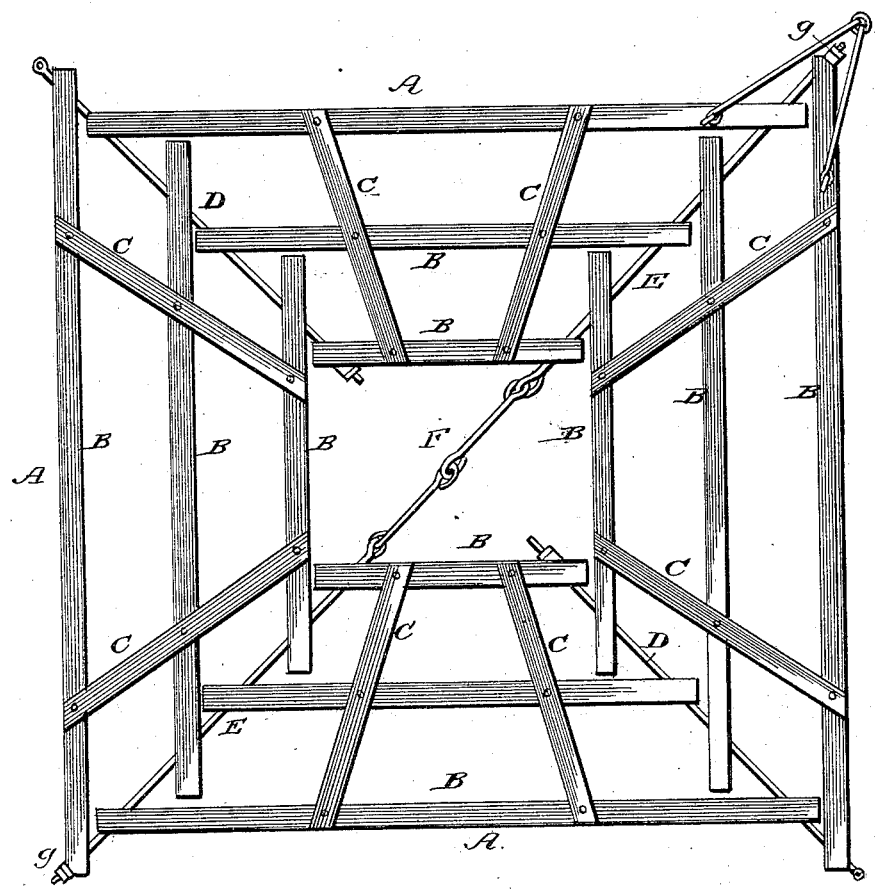
WITNESSES:
Fred G. Dieterich.
Jos. A. Ryan.
H. F. Hubbard
Wm H. Noble
by C. W. Fitch
INVENTORS.
ATTORNEY

UNITED STATES PATENT OFFICE.

HARVEY F. HUBBARD AND WILLIAM H. NOBLE, OF MANITOWOC, WIS.

HARROW.

SPECIFICATION forming part of Letters Patent No. 309,624, dated December 23, 1884.

Application filed March 28, 1884. (No model.)

*To all whom it may concern:*

Be it known that we, HARVEY F. HUBBARD and WILLIAM H. NOBLE, citizens of the United States, residing at Manitowoc, in the county of Manitowoc and State of Wisconsin, have invented certain new and useful Improvements in Harrows, of which the following is a specification, reference being had therein to the accompanying drawing.

Our invention consists in an improvement of the harrow for which Letters Patent of the United States No. 254,017 were granted February 21, 1882, to George Jackson, which improvement will hereinafter fully and at large appear.

The accompanying drawing, which forms part of this specification, represents a top view or plan of the before-mentioned harrow and our improvement thereof.

The harrow is constructed in four parts or sections, A, formed of three beams, B, secured to braces C. The sections A are loosely pivoted together by means of pivotal rods D and E. The harrow in all respects is constructed in the manner described in the before-mentioned Letters Patent, excepting in the following particulars: The pivotal rods E are coupled together by means of two or more links, F, and the outer ends of said rods are furnished with screw-nuts g. This constitutes the essential elements of our improvement.

It will be observed by reference to the accompanying drawing that the line of draft is in line with the pivotal-rods E, and the tendency in the harrow described in said Letters Patent is to cause the sections A to impinge on the pivotal rods, so as to become rigid and inoperative, thereby preventing the sections A from adjusting themselves to the surface of the ground over which they may be dragged. This we have found by experience to be the case, and we have also found in like manner that by coupling the pivotal rods E together in manner herein set forth the said rods may be adjusted with relation to the sections A, through the medium of the links F and screw-nuts g, so that said sections will move easily on their pivotal rods, whereby the several sections will adjust themselves to the surface of the ground over which they may be dragged.

Having thus described our improvement, what we claim is—

A harrow constructed substantially as herein described, having its sections loosely connected by pivotal rods D E, the said rods E being arranged in the line of draft and coupled together by the links F, as shown, and having the adjusting-nuts g on their outer ends.

In testimony whereof we have affixed our signatures in presence of two witnesses.

HARVEY F. HUBBARD.
WILLIAM H. NOBLE.

Witnesses:
E. E. BLODGETT,
ENOS C. HOLLENBACK.